May 28, 1957     L. D. COBB     2,793,729
ONE-WAY CLUTCH
Filed Feb. 18, 1954
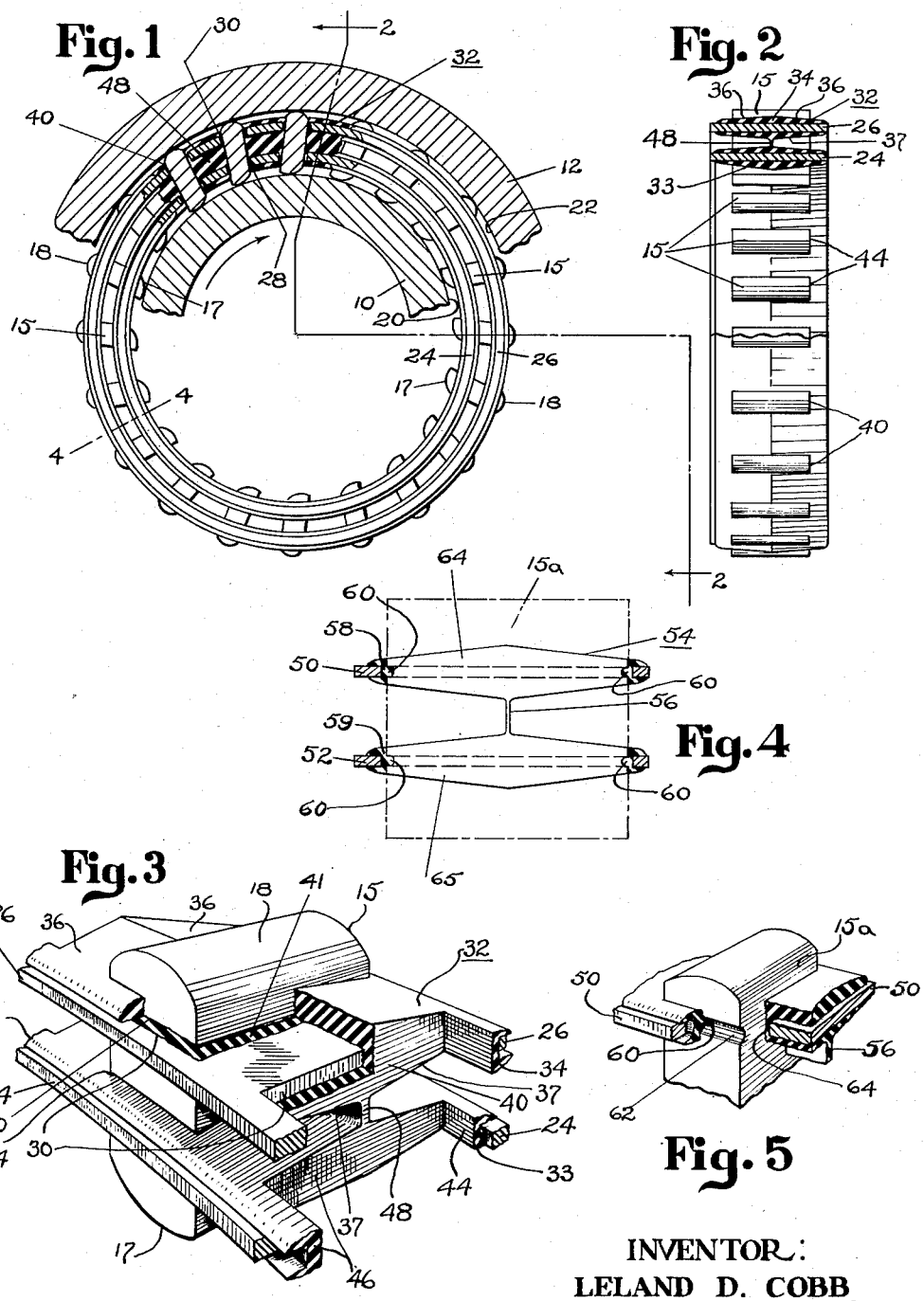
INVENTOR:
LELAND D. COBB
BY Edward H. Goodrich
HIS ATTORNEY.

United States Patent Office 2,793,729
Patented May 28, 1957

2,793,729

ONE-WAY CLUTCH

Leland D. Cobb, Forestville, Conn., assignor to General Motors Corporation, Detroit, Mich., a corporation of Delaware Application February 18, 1954, Serial No. 411,102

13 Claims. (Cl. 192—45.1)

This invention relates to one-way clutches and particularly to a clutch mechanism having a series of spaced grippers that are simultaneously guided into and out of uni-directional driving connection between a pair of relatively rotatable coaxial members.

An object of the invention is to provide an improved unit-handling clutch assembly which may be easily inserted between a pair of concentric cylindrical surfaces and which will serve as a uni-directional drive from one surface to the other.

Another object is to provide an improved one-way clutch having cage-controlled grippers held in position by an inherently resilient material.

A further object of this invention resides in the provision of an improved one-way clutch wherein cake rings, which control the simultaneous shifting of grippers into and out of clutch driving positions, are secured in unit-handling relation by an inherently resilient material.

A still further object of this invention is to provide a unit-handling clutch assembly of simple and economical construction wherein cages guide the simultaneous shifting of grippers into and out of operative one-way driving positions, these cages being interconnected by a resilient gripper-holding material which urges the grippers towards clutch driving positions.

To these ends and also to improve generally upon devices of this character, this invention consists in the various matters hereinafter described and claimed. In its broader aspects, the invention is not necessarily limited to the specific structure selected for illustrative purposes in the accompanying drawings wherein:

Figure 1 is a fragmentary end elevation with some parts in section and showing one embodiment of the invention.

Figure 2 is a cross section partly in full elevation and taken along the broken line 2—2 of Figure 1.

Figure 3 is a fragmentary perspective view illustrating the mounting of one of the grippers through the cages.

Figure 4 is a cross sectional view taken substantially along the line 4—4 of Figure 1 and showing a modified form of this invention, and Figure 5 is a fragmentary view showing the cage mounting of a gripper in the modified form of Figure 4.

In the embodiment of Figures 1, 2 and 3, my unit-handling clutch assembly is arranged to transmit a one-way driving connection between a pair of relatively rotatable members as a driving race ring 10 and a driven race ring 12, these rings being suitably held in coaxial relation. This clutched driving engagement is effected through circumferentially spaced grippers or sprags 15 having arcuate end faces 17 and 18 respectively arranged to be tilted into and out of wedged driving engagement with a cylindrical face 20 on the race ring 10 and with a cylindrical face 22 on the race ring 12. In the illustrated form, when the race ring 10 is rotated in the direction of the arrow, a one-way driving connection is effected through the sprags 15 to the race ring 12 and when the inner ring 10 is rotated in the opposite direction or when the outer race ring 12 overruns the inner race ring in the direction of driving rotation, there is no driving connection between the race rings. The distance between the sprag faces 17 and 18 exceeds the radial distance between the raceways 20 and 22, thus preventing each gripper from shifting into and past a dead center radial position wherein no driving relation would exist. Also, I preferably locate the axes of the arcuate faces 17 and 18 laterally spaced from each other to aid the camming engagement of these end driving faces into and out of clutch operating positions.

To assure full phasing sprag action wherein all of the sprags or grippers 15 are simultaneously tilted into and out of driving engagement for a uniformly distributed load among all of the sprags, a pair of inner and outer cage rings 24 and 26 are provided with correspondingly located circumferentially spaced openings 28 and 30 through which the ends of the sprags project for engagement with the raceways 20 and 22. These openings are larger than and generally correspond in shape to the rectangular cross section of the sprags. An inherently resilient annular member 32 of rubber-like material is molded about each of the cage rings 24 and 26 to hold these rings substantially coaxial for slight relative rotation with respect to each other. This member 32 may be composed of various rubber-like materials which will not deteriorate or materially change resiliency in the presence of heat, light, and lubricant; one satisfactory material being a resilient vulcanized synthetic rubber containing a polymerization product of butadiene and acrylic nitrile.

The resilient member 32 has annular portions 33 and 34 molded around and embracing the respective inner and outer cages 24 and 26. If desired, the edges of the cage rings 24 and 26 may laterally project slightly from the annular portions 33 and 34 as shown. The annular portion 34, which has sloping inner and outer walls 36 and 37, is provided with rectangular openings 40 having side and end walls which matingly grip the sprags thus providing in each cage opening 30 a yieldably resilient lining 41 surrounding a sprag 15. Similarly, the annular resilient portion 33 that embraces the inner cage ring 24, has circumferentially spaced openings 44 and linings 46, similar to the resilient linings 41, for gripping the inner end of each sprag within the inner cage openings 28. The inner and outer peripheries of the annular portion 33 may also have sloping walls corresponding to the walls 36 and 37. The rubber-like material of the annular portions 33 and 34 is preferably vulcanized to the cages and to the sprags, thus providing a unit-handling structure. Due to the inherent resiliency of the annular portions 33 and 34 and their sprag gripping linings 41 and 46, the cage rings 24 and 26 may be rotated slightly relative to each other to initially tilt the sprags for insertion of the sprags and clutching parts between the race rings 10 and 12 after which the rubber linings 41 and 46 which are now slightly deformed by shear stresses will resiliently urge the sprags towards clutch gripping positions. Hence, when the race ring 10 is rotated in the direction of the arrow, the sprags immediately wedge into driving engagement to impart a one-way drive to the raceway 12. However, when an opposite rotation is imparted to the race ring 10 or when the race ring 12 overruns the race ring 10 in a driving direction, the yieldability of the inherently resilient linings 41 and 46 permits a sufficient tilting of the sprags within the cage openings to permit relative rotation of the race rings in a non-driving direction.

To further resiliently urge each sprag towards a clutch driving position, I preferably provide between each of the annular portions 33 and 34, generally radially disposed narrow web portions 48 that respectively extend into end abutting engagement with intermediate portions of adjacent sprags 15 as best shown in Figure 3. These web portions 48 which make the resilient annular member 32 generally H-shape in cross section, will be slightly longitudinally distorted under shear stress when the clutch is installed between the race rings 10 and 12, thus cooperating with the linings 41 and 44 to resiliently urge the sprags towards clutch gripping positions. If desired, the web portions 48 may be eliminated in which event the linings 41 and 46 that are secured to the sprags, will hold the cages 24 and 26 in position.

In the embodiment of Figures 4 and 5, a pair of cage rings 50 and 52 are held in coaxial relation by a generally H-shape synthetic rubber ring 54 having central web portions 56, this rubber-like ring 54 generally corresponding in shape to the annular member 32. However, in this particular construction, inherently resilient linings 58 and 59 which receive and grip peripherally spaced sprags 15a, are formed with inwardly projecting ribs 60 that may be resiliently snapped into and out of engagement with correspondingly located grooves 62 in each sprag as shown in Figure 5. With this construction, the cages 50 and 52 may have the rubber-like member 54 molded in gripping relation therewith and preferably vulcanized thereto, and the sprags 15a may be thereafter demountably snapped into cage pockets 64, 65 thus providing a unit-handling clutch assembly.

I claim:

1. A one-way clutch for driving connection between relatively rotatable annular race members comprising a plurality of circumferentially spaced tiltable grippers arranged to be shifted into and out of race member engagement, an annular cage arranged to be received between the race members and having a plurality of circumferentially spaced openings therethrough, a gripper extending through each opening, and an inherently resilient lining bonded to the cage in each opening and resiliently embracing each gripper for tiltable relation to the cage, said linings embracing intermediate portions of the grippers and locating the cage in radially spaced relation to the race members.

2. A one-way clutch for driving connection between relatively rotatable annular race members comprising a plurality of circumferentially spaced grippers arranged to be tiltably shifted into and out of race member engagement, a cage ring arranged to be received between the race members and having a plurality of peripheral spaced grippers received in openings therethrough, an inherently resilient annular member surrounding the cage ring and bonded thereto, the annular resilient member extending through each of said openings and providing resilient linings therein which are in respective yieldable embracing relation to the grippers to allow for tiltable gripper movement within the cage ring, and said linings being secured to portions of the grippers intermediate the gripper ends for holding the grippers in unit-handling relation with the cage and supporting the cage in radially spaced relation to both of the race members.

3. A one-way clutch for driving connection between relatively rotatable annular race members comprising a plurality of circumferentially spaced tiltable grippers arranged to be shifted into and out of race member engagement, a cage ring between and in spaced relation to the race members and having a plurality of circumferentially spaced openings therethrough, a gripper extending through each opening, a deformably resilient lining within each opening and bonded to the cage and resiliently embracing the gripper within the cage opening, and means demountably securing each gripper to its associated lining.

4. A one-way clutch for driving connection between relatively rotatable annular race members comprising a plurality of circumferentially spaced tiltable grippers arranged to be shifted into and out of race member engagement, a cage ring arranged to be received between the race members and having a plurality of circumferentially spaced openings therethrough, a gripper extending through each opening, a deformably resilient lining within each opening and bonded to the cage and resiliently embracing the gripper in the cage opening, and said linings and grippers being respectively provided within the cage openings with interfitting projections and recesses which demountably hold the grippers in unit-handling relation with the cage.

5. A one-way clutch for driving connection between relatively rotatable annular members comprising a plurality of circumferentially spaced tiltable grippers arranged to be shifted into and out of race member engagement, a pair of cage rings arranged to be received in radially spaced relation between the race members and having peripherally spaced gripper-receiving openings, an inherently resilient lining of rubber-like material bonded to each cage within each opening, grippers respectively extending through corresponding openings in both cages and resiliently embraced by said linings, said linings being bonded to the grippers and securing them in unit-handling assembly with the cages but in spaced relation thereto, and said linings embracing spaced intermediate portions of the grippers for locating the cage rings in radially spaced relation to each other and in radially spaced relation to both of the annular race members.

6. A one-way clutch for driving connection between relatively rotatable annular race members comprising a plurality of circumferentially spaced tiltable grippers arranged to be shifted into and out of race member engagement, a pair of radially spaced inner and outer cage rings arranged to be received between the race members, said rings being provided with correspondingly located peripherally spaced gripper-receiving openings therethrough, inherently resilient annular rubber-like members respectively molded in surrounding relation to each cage and having portions extending through the cages which provide resiliently yieldable linings within each cage opening, a gripper extending through a corresponding opening in each cage and resiliently held intermediate of its ends by a pair of said linings bonded thereto, said linings being under shear deformations and resiliently urging the grippers toward clutch driving positions when the clutch is located between said race members.

7. A one-way clutch for driving connection between relatively rotatable annular race members comprising a plurality of circumferentially spaced tiltable grippers arranged to be shifted into and out of race member engagement, a pair of substantially rigid cage rings arranged to be received in spaced relation between the race members and having correspondingly located peripherally spaced gripper-receiving openings, and an inherently resilient integral rubber-like member molded about both cages and supporting said cages in predetermined spaced unit-handling relation, and said resilient member extending through the cage openings and providing spaced resilient linings in embracing relation to grippers which extend through corresponding openings in both cage rings.

8. A one-way clutch for driving connection between relatively rotatable annular race members comprising a plurality of circumferentially spaced tiltable grippers arranged to be shifted into and out of race member engagement, a pair of cage rings arranged to be received in radially spaced relation between the race members and having correspondingly located peripherally spaced gripper-receiving openings, an annular inherently resilient rubber-like member molded about each cage ring, said annular members having portions extending through the cage ring openings and providing resilient linings therefor, grippers extending through corresponding cage ring openings and resiliently embraced by said linings at intermediate portions of the grippers, and inherently resilient web portions between the grippers and bonded to each resilient annular member and locating the cage rings in predetermined spaced relation, said web portions being narrower than the width of a gripper.

9. A one-way clutch for driving connection between relatively rotatable annular race members comprising a plurality of circumferentially spaced grippers arranged to be tiltably shifted into and out of race member engagement, a pair of radially spaced cage rings arranged to be received between the race members and having correspondingly located peripherally spaced openings through which the grippers respectively extend for race member engagement, and an inherently resilient member having spaced annular portions respectively surrounding said cage rings having interconnecting narrow web portions securing the cage rings in radially spaced unit-handling relation, the annular portions extending through said openings and resiliently embracing the grippers, and said resilient member simultaneously and tiltably urging the grippers toward race member engaging positions when the clutch is located between the race members.

10. A one-way clutch for driving connection between relatively rotatable annular race members comprising a plurality of circumferentially spaced grippers arranged to be tilted into and out of race member engagement, a pair of substantially rigid cage rings arranged to be received in radially spaced relation between the race members and having correspondingly located peripherally spaced openings through which the grippers extend for race member engagement, an inherently resilient rubber-like member molded about each cage ring and providing a resilient lining in each opening for resiliently holding a gripper, and interfitting portions on the grippers and on said linings within the cage rings demountably securing the grippers in unit-handling relation to the cage rings.

11. A one-way clutch for driving connection between relatively rotatable annular race members comprising a plurality of circumferentially spaced grippers arranged to be shifted into and out of race member engagement, a pair of substantially rigid cage rings arranged to be received in radially spaced relation between the race members and having correspondingly located peripherally spaced openings through which the grippers extend for race member engagement, an inherently resilient synthetic rubber member having annular portions respectively molded about and embracing each cage ring, a synthetic rubber lining in each cage ring opening and embracing a gripper in spaced relation to the cage ring, said resilient member having spaced narrow webbed portions interconnecting said annular portions about the cage rings and holding the cage rings in unit-handling assembly, and the cage rings and said synthetic rubber member being generally H-shaped in cross section between adjacent grippers.

12. A one-way clutch for driving connection between relatively rotatable annular race members comprising a plurality of circumferentially spaced tiltable grippers arranged to be shifted into and out of race member engagement, a pair of substantially rigid cage rings arranged to be received in radially spaced relation between the race members and having peripherally spaced correspondingly located gripper-receiving openings, an inherently resilient rubber-like member having annular portions respectively bonded about the cage rings, said resilient member extending through the cage openings and providing resilient linings, said resilient member having narrow radially disposed web portions interconnecting its annular portions and interconnecting adjacent linings to provide a unit-handling cage wherein the cage rings are relatively movable in a circumferential direction with respect to each other, and grippers extending through corresponding cage openings and demountably held in position by portions of said linings.

13. A one-way clutch for driving a connection between relatively rotatable annular race members comprising a plurality of circumferentially spaced tiltable grippers arranged to be simultaneously tilted into and out of race member driving engagement, a pair of substantially rigid radially spaced cage rings between and radially spaced from the race members, said cage rings having peripherally spaced correspondingly located gripper-receiving openings through which the grippers extend in spaced relation to said cage rings, an inherently resilient rubber-like member having annular portions in which the cage rings are embedded and having intermediate their widths narrow webs bonded thereto, said annular portions extending through the cage openings and providing resilient linings between the grippers and a cage and bonded to a gripper and a cage, and said web portions being bonded at their ends respectively to said grippers and to the gripper engaged linings whereby the cages and grippers will be held in unit-handling spaced relation.

References Cited in the file of this patent
UNITED STATES PATENTS

| | | |
|---|---|---|
| 2,473,250 | Hoffman | June 14, 1949 |
| 2,520,004 | Gondek | Aug. 22, 1950 |
| 2,555,484 | Gruenberg et al. | June 5, 1951 |
| 2,614,670 | Heintz | Oct. 21, 1952 |
| 2,624,436 | Gamble | June 6, 1953 |